United States Patent [19]

Scheberle et al.

[11] Patent Number: 4,657,218
[45] Date of Patent: Apr. 14, 1987

[54] ADJUSTABLE CHAIR PEDESTAL

[75] Inventors: James W. Scheberle; Paul K. Smith, both of Terre Haute, Ind.

[73] Assignee: J. I. Case Company, Racine, Wis.

[21] Appl. No.: 819,940

[22] Filed: Jan. 21, 1986

[51] Int. Cl.⁴ ............................................. F16M 11/00
[52] U.S. Cl. .................................... 248/411; 248/162.1
[58] Field of Search ............... 248/669, 125, 411, 161,
248/412, 413, 157, 188.5, 295.1, 333, 354.4,
162.1; 297/345; 108/144, 147, 148

[56] References Cited

U.S. PATENT DOCUMENTS

| 131,776 | 10/1872 | Payne | 108/148 |
|---|---|---|---|
| 232,098 | 9/1880 | Zeimet et al. | 248/413 X |
| 1,166,435 | 1/1916 | Cogger | 248/411 |
| 1,545,115 | 7/1925 | Amsden | 248/411 |
| 1,610,069 | 12/1926 | Weber | 248/623 |
| 2,260,241 | 10/1941 | Bargen | 248/411 X |
| 3,758,063 | 9/1973 | Lacey | 248/411 X |
| 4,047,687 | 9/1977 | Turner | 248/318 |

Primary Examiner—J. Franklin Foss
Attorney, Agent, or Firm—Peter N. Jansson

[57] ABSTRACT

An improved easily-adjustable chair pedestal having two principal tubular members, including a base member and a pedestal tube therein, which are axially adjustable to an infinite number of positions and are clamped together at the desired relative positions. An off-center coil spring, which is held in proper vertical alignment by support structure, biases the pedestal tube upwardly. A clamp screw passes through an orifice in the base member and through a slot in the pedestal tube and is threadedly engaged with a locking block, located inside the pedestal tube in space provided by the off-center location of the spring, to hold the principal tubular members in position.

4 Claims, 4 Drawing Figures

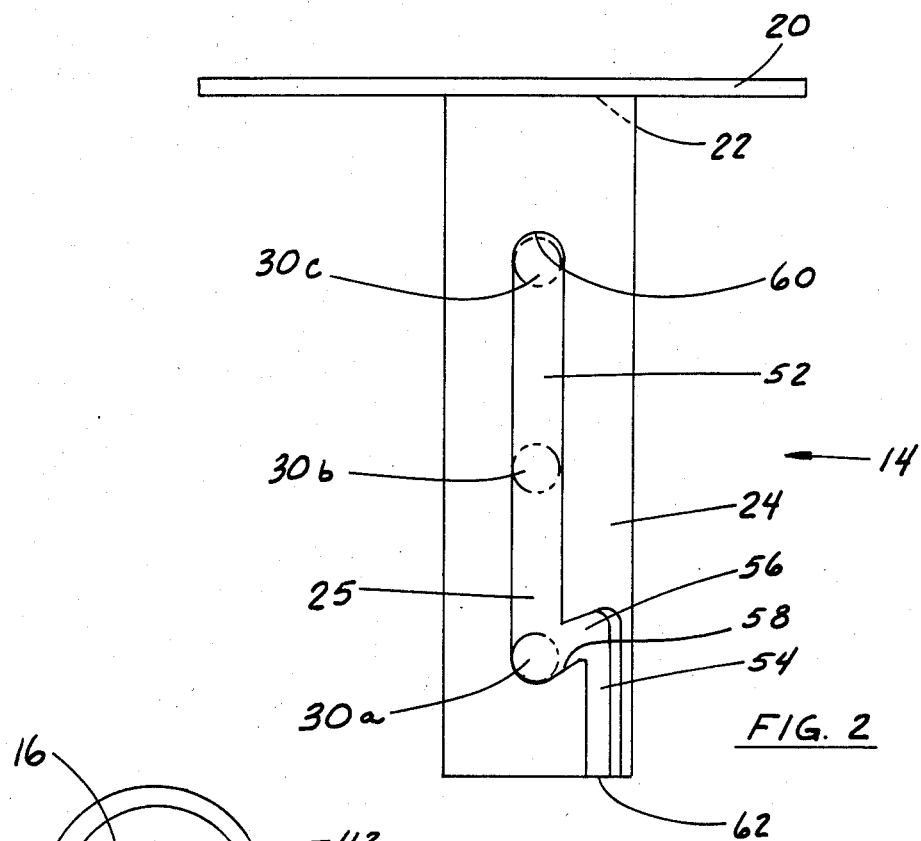
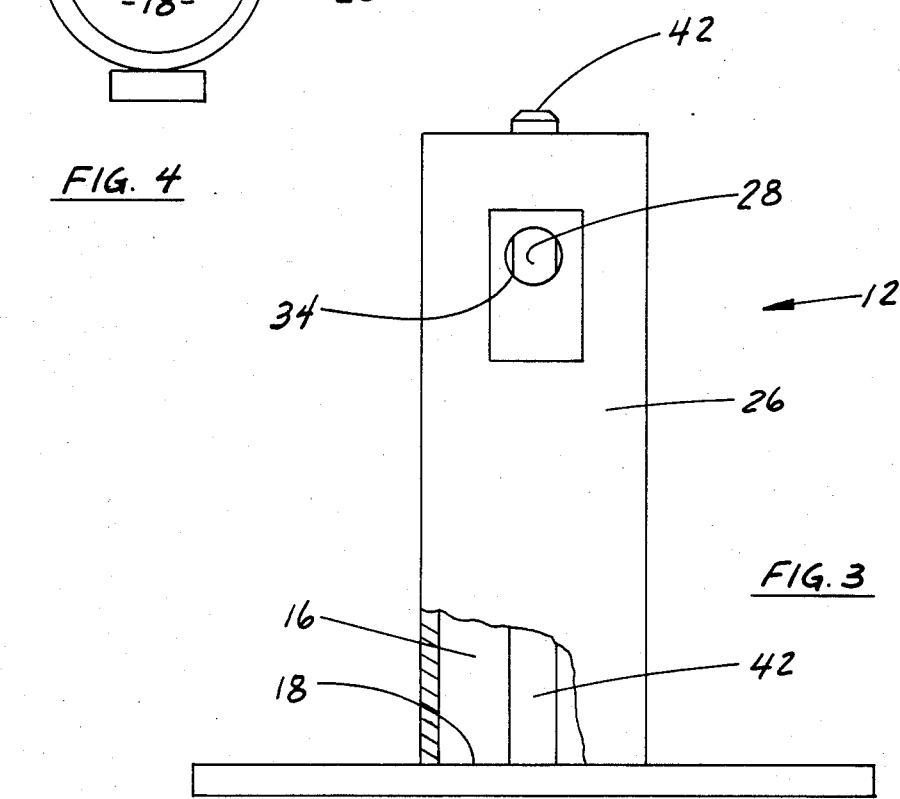

ADJUSTABLE CHAIR PEDESTAL

FIELD OF THE INVENTION

This invention is related generally to adjustable chair pedestals and, more specifically, to pedestals for automotive seats such as those used in tractors, farm implements, heavy construction equipment, trucks and the like.

BACKGROUND OF THE INVENTION

Since time immemorial, efforts have been directed to the development of improved chairs. A good deal of such effort has been directed toward development of chairs which are adjustable to accommodate people of different sizes or tasks to be performed in different positions. Many patents have been granted for improvements in adjustable seat pedestals, particularly for seats used in various automotive applications.

Among the prior U.S. patents dealing with adjustable chair pedestals are the following: U.S. Pat. Nos. 4,076,201 (Hudnall); 580,665 (Goshorn); 3,845,926 (Wahls); 2,658,557 (Nordmark et al.); 4,417,744 (Spear); 1,884,497 (Abbott); 3,642,320 (Ward); 4,062,588 (Draney); 3,642,088 (Smith); 3,515,432 (Sporman); 3,508,733 (Skeel); 3,437,373 (Boston); and 3,448,820 (Aiello et al.).

A review of the prior art indicates that vertical adjustment of pedestal chairs has been accomplished in many different ways and with many different pedestal structures. In most cases, the manipulations necessary to accomplish vertical adjustment are rather complex. It is desirable, particularly in pedestal seats for automotive uses, to be able to carry out adjustments with a minimum number of manipulative steps.

This invention is directed toward achieving simplicity in pedestal height adjustment, in order that such adjustment may be carried out quickly and without the level of attention required of a person when complex manipulative steps are involved. In particular, this invention is directed toward allowing adjustment by someone while seated in the chair.

Many of the prior devices have the disadvantage of a limited number of vertical positions of adjustment. To suit the differing needs of people who use a seat, it is desirable to be able to adjust the seat to an infinite number of positions. This invention is directed not only to achieving simplicity of adjustment but to allowing such adjustment to an infinite number of vertical positions.

Many of the prior art devices are complex and expensive in structure. Such complexity adds cost, makes pedestal assembly and disassembly difficult, and may make the structure more susceptible to breakdown and more difficult to repair. This invention is directed toward providing a simple adjustable chair pedestal assembly which may easily be assembled and disassembled, is strong and reliable in construction, and is easily repaired if repair should ever by required.

In summary, there is a need for an improved chair pedestal which is easily adjustable to an infinite number of vertical positions with a minimum of manipulative steps, simple in structure, easily assembled and disassembled, and reliable.

BRIEF SUMMARY OF THE INVENTION

This invention is an improved adjustable chair pedestal which overcomes some problems and disadvantages of the prior art, including those mentioned above.

The inventive structure includes two principal tubular members the relative axial positions of which determine chair height. These include a base tube secured to an underlying supporting structure and a pedestal tube secured to the seat.

The base member has a tubular vertical recess which terminates in a floor means and has a lateral clamp-receiving orifice. The pedestal tube has an inside ceiling means and has a vertical slot in its wall with a lower horizontal stop. These two principal tubular members are clamped together by a clamping means passing through the clamp-receiving orifice and the slot.

Inside the two principal tubular members is a spring means which extends in compression between the floor means and the ceiling means to bias the pedestal tube upwardly. The spring means, preferably a stiff coil spring, provides all the force needed to move the seat upwardly during adjustment. When someone sitting in the seat releases the clamping means and removes or lightens his weight sufficiently, the pedestal tube and the seat secured to it will rise by virtue of the spring action. When the clamp means is released and the person's weight is applied by sitting on the seat, the pedestal tube and seat will move down against the upward biasing force of the spring.

After the seat has reached the desired vertical position, by either upward or downward movement as described, the clamping means is tightened to fix the relative positions of the base member and the pedestal tube. The clamping means is preferably a clamp screw which extends from a gripping means outside the base member through the clamp-receiving orifice of the base member and the slot of the pedestal tube to engage a locking member which is inside the pedestal tube and adjacent to the clamp-receiving orifice.

The clamp screw has a distal end which is threadedly engaged with such locking member. The clamp screw has a annular shoulder which engages the outside of the base member to prevent further insertion, so that when the clamp screw is turned, the locking member inside the pedestal tube will be drawn tightly against the inside wall of the pedestal tube to achieve the clamping engagement which hold the base member and the pedestal tube in the desired relative positions.

Preferred embodiments of this invention include means inside the two principal tubular members to support the coil spring in vertical alignment. An upwardly-extending vertical guide pin is secured to the floor of the base member in an off-center position to provide space for the locking member, previously mentioned. The lower end of the coil spring is sleeved over the vertical guide pin and thereby held in proper vertical alignment.

A vertical guide tube is received within the coil spring at its upper end, the upper ends of the coil spring and guide tube being aligned by virtue of a outward flange at the upper end of the guide tube which prevents its further insertion into the coil spring. The vertical guide tube has an inner diameter sufficient to receive the upwardly-extending vertical guide pin in telescoping fashion. This combination of spring, vertical guide pin and vertical guide tube serve to maintain the coil spring firmly in the proper vertical alignment in an off-center position with respect to the base member and the pedestal member.

The aforementioned slot in the wall of the pedestal tube preferably has major and minor vertical portions which are angularly offset and are joined by a generally horizontally-extending connecting slot portion. Such connecting portion of the slot includes the aforementioned stop, which is at the lower end of the major vertical portion of the slot.

The lower end of the minor vertical portion is an opening at the lower edge of the pedestal tube. Such opening facilitates assembly and disassembly of the pedestal of this invention. Assembly is accomplished easily, after all the coil spring and guide tube are in place, by pushing the pedestal tube downwardly such that the minor vertical position of the slot is received over the clamp screw. Then, after the pedestal tube and base member are pushed together until the clamp screw engages the connecting portion of the slot, the pedestal tube is rotated with respect to the base member through the angle defined by the connecting portion of the slot such that the clamp screw finally arrives at the major vertical portion of the slot, where it remains during use.

In preferred embodiments, the slot doubles back at the juncture of its major vertical portion and the connecting portion and again at the juncture of the connecting portion with the minor vertical portion. This Z-like slot pattern helps to avoid any unintentional disassembly of the pedestal of this invention during operation. That is, the horizontal stop portion of the slot will not be passed during upward adjustment of the chair to its highest position when this preferred slot configuration is used.

OBJECTS OF THE INVENTION

It is an object of this invention to provide an improved adjustable chair pedestal overcoming some of the problems and shortcomings of devices of the prior art.

Another object of this invention is to provide an improved adjustable chair pedestal which is easily operable with a minimum of manipulative steps.

Another object of this invention is to provide an easily-adjustable chair pedestal which has an infinite number of vertical adjustment positions.

Another object of this invention is to provide an improved adjustable chair pedestal which is simple in construction and may easily be assembled and disassembled.

These and other important objects of this invention will be apparent from the following additional descriptions and from the drawings, wherein:

BRIEF DESCRIPTION OF THE DRAWINGS

FIG. 2 is an enlarged side elevation of the upper movable pedestal tube portion of the device of FIG. 1.

FIG. 3 is a partially cutaway enlarged side elevation of the base portion of the device of FIG. 1.

FIG. 4 is a top view of FIG. 3, excluding the base plate.

DETAILED DESCRIPTION OF PREFERRED EMBODIMENTS

Figure 1:
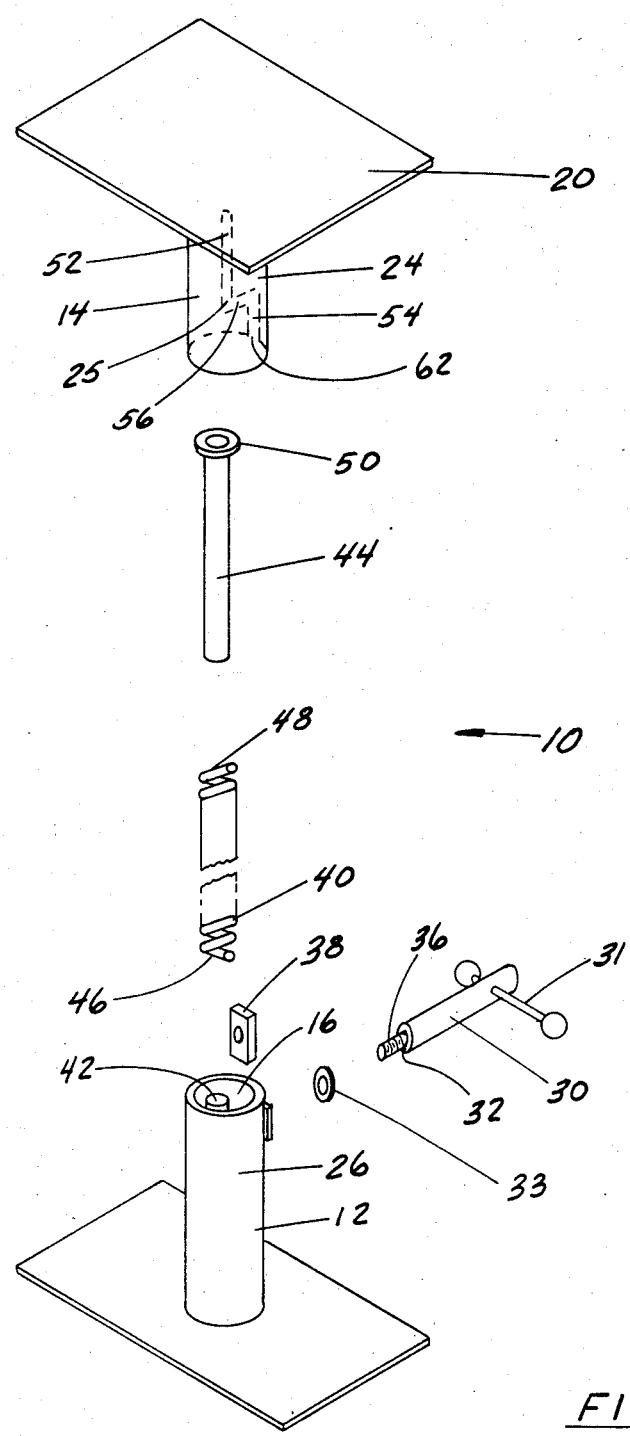
FIG. 1 is an exploded perspective view of a preferred adjustable pedestal in accordance with this invention.

The figures illustrate a preferred adjustable chair pedestal 10 in accordance with this invention. The two principal tubular members of adjustable chair pedestal 10 are base member 12 and pedestal tube 14.

Base member 12 has a tubular vertical recess 16 which terminates in a floor 18, illustrated best in FIGS. 3 and 4. Pedestal tube 14 is secured with respect to a seat, a lower plate portion 20 of which is illustrated in FIGS. 1 and 2. Pedestal tube 14 also includes an inside ceiling 22, which is the underside of lower plate portion 20, and a cylindrical wall 24 which defines a vertical slot 25.

Pedestal tube 14 is generally cylindrical in shape as is the tubular vertical recess 16 of base member 12. Recess 16 and pedestal tube 14 are dimensioned such that pedestal tube 14 may be received into recess 16 in a close but loose fit. The degree of insertion of pedestal tube 14 into recess 16 of base member 12 determines the height adjustment of the seat.

Base member 12 has a wall 26 which includes a lateral clamp-receiving orifice 28. A clamp screw 30 extends in a radial direction through clamp-receiving orifice 12 and through slot 26 to clamp base member 12 and pedestal tube together, in a manner hereafter described, at the desired relative degree of insertion of pedestal tube 14 into recess 16.

Clamp screw 30 includes an annular shoulder 32 which engages a washer 33 supported against the outside edge 34 of clamp-receiving orifice 28 to prevent insertion of clamp screw 30 beyond that point. Clamp screw 30 also includes a threaded distal end 36 which is received by a locking block member 38 located inside pedestal tube 14 and base member 12 at a position adjacent to orifice 28. Locking block member 38 has a threaded orifice to receive distal end 36 of clamp screw 30.

As clamp screw 30 is turned clockwise, locking block member 38 is drawn toward the inside surface of pedestal tube 14 to clamp pedestal tube 14 and base member 12 together and hold them in the selected relative axial positions. Locking block member 38 is dimensioned so that it can be received within pedestal tube 14 and base member 12, and be held non-rotatably in such position.

Clamp screw 30 has a handle 31 at its outer end. Handle 31 provides good leverage so that clamp screw 30 may be easily loosened by someone sitting in the chair and easily tightened sufficiently to hold base member 12 and pedestal tube 14 in the desired relative axial positions.

A coil spring 40 inside pedestal tube 14 and base member 12 extends in compression from floor 18 to ceiling 22, thus biasing pedestal tube 14 upwardly. Coil spring 40 is held in the proper position and proper alignment in the apparatus of this invention by virtue of vertical guide pin 42 and vertical guide tube 44.

Vertical guide pin 42 is firmly attached to floor 18 in an off-center position with respect to tubular vertical recess 16 of base member 12, as illustrated best in FIG. 4. Such off-center positioning provides space for locking block member 38.

Coil spring 40 is sleeved over vertical guide pin 42 and has a lower end 46 which rests against floor 18. Vertical guide tube 44 is received into coil spring 40 at the upper end 48 of the spring. Vertical guide tube 44 includes a flange 50 at its upper end which limits the degree of insertion of guide tube 44 into the upper end of coil spring 40. Guide tube 44 has an inner diameter of sufficient dimension to receive vertical guide pin 42 in adjustable telescoping relation. Vertical guide pin 42 and vertical guide tube 44 serve to hold coil spring 40 in vertical alignment offset from the common center line of base member 12 and pedestal tube 14.

Slot 25 has a major vertical portion 52 and a minor vertical portion 54 which are angularly offset around the circumference of pedestal tube 14. Slot 25 also has a generally horizontally-extending connecting portion 56 which joins major and minor vertical slot portions 52 and 54. At the juncture of connecting portion 56 with major vertical portion 52, the slot is doubled back to some extent. The slot is also doubled back at the juncture of connecting portion 56 and minor vertical portion 54. This forms a Z-like slot shape in wall 24 of pedestal tube 14.

Major vertical portion 52 of slot 25 terminates downwardly in a horizontal stop edge 58. As pedestal tube 14 moves within base member 12, clamp screw 30 passes through the major slot portion 52 at different positions. Horizontal stop edge 58 defines the position of maximum height adjustment, at which point clamp screw 30 contacts horizontal stop edge 58, as illustrated by numeral 30a near the bottom of FIG. 2. Clamp screw 30 is also illustrated in FIG. 2 at intermediate and lower positions 30b and 30c, respectively. When the chair is in its lowest position, the clamp screw is at the upper end 60 of major vertical slot portion 52.

The doubled-back configuration of slot 25 serves to hold the pedestal assembly firmly together even when the chair is at its highest position, because the clamp screw 30 cannot readily pass horizontal stop edge 58 unless intentional steps are take to disassemble the structure.

Minor vertical slot portion 54 terminates downwardly in an slot open end 62. When the structure is being assembled or disassembled, pedestal tube 14 can be moved in an axial direction over clamp screw 30 so that it is received into slot 25 through open end 62. After further axial movement, the clamp screw reaches connecting portion 56 of slot 25, at which point pedestal tube 14 is rotated until clamp screw 30 reaches major slot vertical portion 52. Disassembly is carried out in the reverse fashion.

While the principles of this invention have been described in connection with specific embodiments, it should be understood clearly that these descriptions are made only by way of example and are not intended to limit the scope of the invention.

What is claimed:

1. An adjustable chair pedestal comprising:
   a base member including a tubular vertical recess terminating in floor means and having an inside wall and a lateral clamp-receiving orifice:
   a substantially rigid pedestal tube secured with respect to a chair and telescopingly engaged in said recess, said tube having ceiling means and a wall with an inner surface and a vertical slot of substantially fixed cross-dimension, said slot having major and minor angularly-offset vertical portions joined by a generally horizontally-extending connecting portion, said major vertical portion terminating downwardly in said connecting portion to form a lower horizontal stop and said minor portion terminating downwardly in an open slot end;
   a vertically-oriented coil spring inside the pedestal tube and recess and extending in compression from said floor means to said ceiling means to bias the pedestal tube upwardly;
   means inside said pedestal tube and recess to support said coil spring in vertical alignment, said support means including a vertical guide pin secured with respect to the floor and extending inside the coil spring;
   a locking member inside said pedestal tube and adjacent to the clamp-receiving orifice, said locking member being between the coil spring and the inner surface of the pedestal tube; and
   a clamp screw extending radially through the orifice and the slot and terminating a distal end threadedly engaged with said locking member, said clamp screw having gripping means outside the base and pedestal walls,
   whereby tightening of the clamp screw draws the locking member against the inner surface of the pedestal tube to sandwich the pedestal tube between the locking member and the inside wall of the vertical recess.

2. The pedestal of claim 1 wherein the vertical guide pin is secured with respect to the floor in a position off-center with respect to said recess, whereby space is provided for said locking member.

3. The pedestal of claim 2 wherein the support means also has a vertical guide tube received within the coil spring and extending downwardly from the ceiling means into telescoping relation with said vertical pin.

4. The pedestal of claim 1 wherein the slot doubles back at the juncture of its major vertical portion and the connecting portion, whereby the horizontal stop will not be passed during upward adjustment of the chair at its highest position.

* * * * *